Dec. 25, 1923.

H. E. HARRIS

HOB GRINDER

Filed Nov. 29, 1920    5 Sheets-Sheet 5

INVENTOR
HARRY E HARRIS
BY
Arthur B Marsh.
ATTORNEY

Patented Dec. 25, 1923.

1,478,433

UNITED STATES PATENT OFFICE.

HARRY E. HARRIS, OF BRIDGEPORT, CONNECTICUT.

HOB GRINDER.

Application filed November 29, 1920. Serial No. 426,932.

*To all whom it may concern:*

Be it known that HARRY E. HARRIS, a citizen of the United States, residing at Bridgeport, in the county of Fairfield and State of Connecticut, has invented certain new and useful Improvements in Hob Grinders, of which the following is a specification.

This invention relates to an automatic machine for grinding hobs or the like which is readily adjustable to conform to various diameters of hob, angles of teeth, and depth of flute and to position the cutting face of the wheel exactly radial with the center of the hob without disturbing other adjustments.

It provides for mounting the hob between centers in cooperative relation to the cutting or grinding wheel, past the cutting edge of which it is traversed longitudinally. Automatic means is provided for rotating the hob in either direction and to an adjustable extent during the traverse to operate on teeth arranged in either right or left spiral formation of any pitch, or to be traversed without rotation if straight work is desired. Further it provides a friction mechanism by which the rotation for the spiral cut and the feed from one tooth or series of teeth to the tooth or series circumferentially adjacent thereto is effected. This friction drive urges the hob to its limit of travel as determined by an indexing mechanism and a spiral generating or sine bar so that the hob is held accurately to the tool throughout its traverse.

The indexing mechanism above mentioned is also of improved construction, and includes a pair of pawls for engaging a pair of toothed wheels carried on the hob shaft, one of these pawls and wheels serving to slow down and cushion the rotation of the hob till it is locked accurately in its new position by the other pawl and wheel, this construction relieving the locking pawl and wheel from the shock and stress of stopping the rotation of the hob. This construction elminates much of the wear of the locking elements and adds much to the accuracy of their action.

A back gear arrangement for the hob rotating mechanism may be used if desired to increase the range of spiral effected by adjustment of the sine bar.

An automatic feed mechanism is also provided which advances the work periodically toward the tool, usually once in a complete revolution of the hob. This feed is adjustable in extent and is effected through a slip clutch so that the work may yield to unusual obstructions such as would otherwise be likely to damage the machine. It is actuated automatically by the traverse of the work through a mechanism of the gun lock type in which gravity actuated, rather than spring actuated, elements are employed, safety devices being provided to prevent damage through any accidental actuation.

A further feature of the invention relates to the mounting of the grinding wheel by which it may be turned to conform to the amount of spiral of the hob without necessitating modification in its driving connection.

For a more complete understanding of this invention, together with other objects and advantageous details of construction and combinations of parts, reference may be had to the accompanying drawings in which

Fig. 12 is a fragmentary section illustrating a direct drive for the arbor shaft, A represents the machine base which is formed as a hollow box shaped member, the interior thereof housing certain of the machine parts access to which may be had through an opening in the forward face normally covered by a door B. The upper face of the base A carries a guideway 1 for a traversing carriage 2, comprising a dished or pan portion 3 and a platform portion 4. Journaled in the lower portion of base A is a main operating shaft 5 having a chain connection 6, as shown in dotted lines in Fig. 1, to a carriage traversing mechanism comprising a reverse gear device indicated diagrammatically at 7 which acts through a pair of beveled gears to turn a vertical shaft 8 having fixed thereto a pinion 9 meshing with a rack 10 fixed to the carriage 2. This traversing mechanism forms no part of this invention and has therefore not been shown in detail. It should however be of a type in which the limit of traverse of the carriage 2 to the right, as seen in Fig. 1, is fixed while its limit of traverse to the left is preferably adjustable according to the length of work being operated upon.

Figure 1:
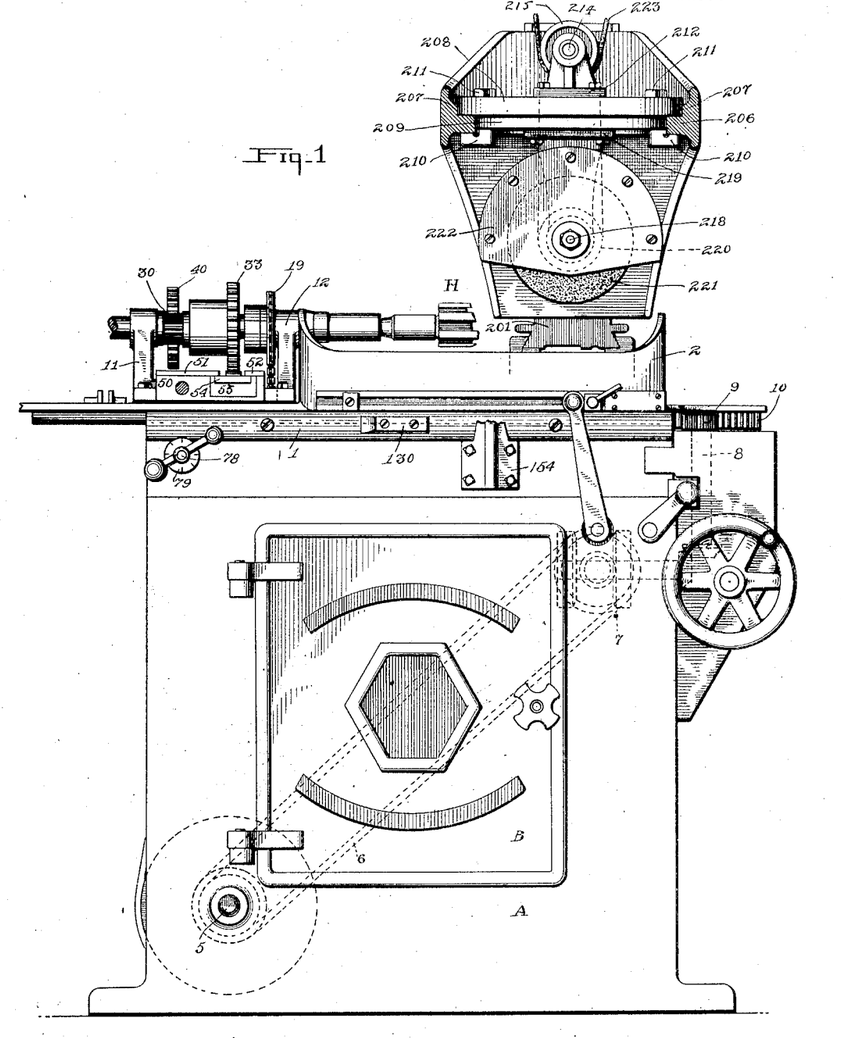
Fig. 1 is a front elevation of the machine with parts in section.
Figure 2:
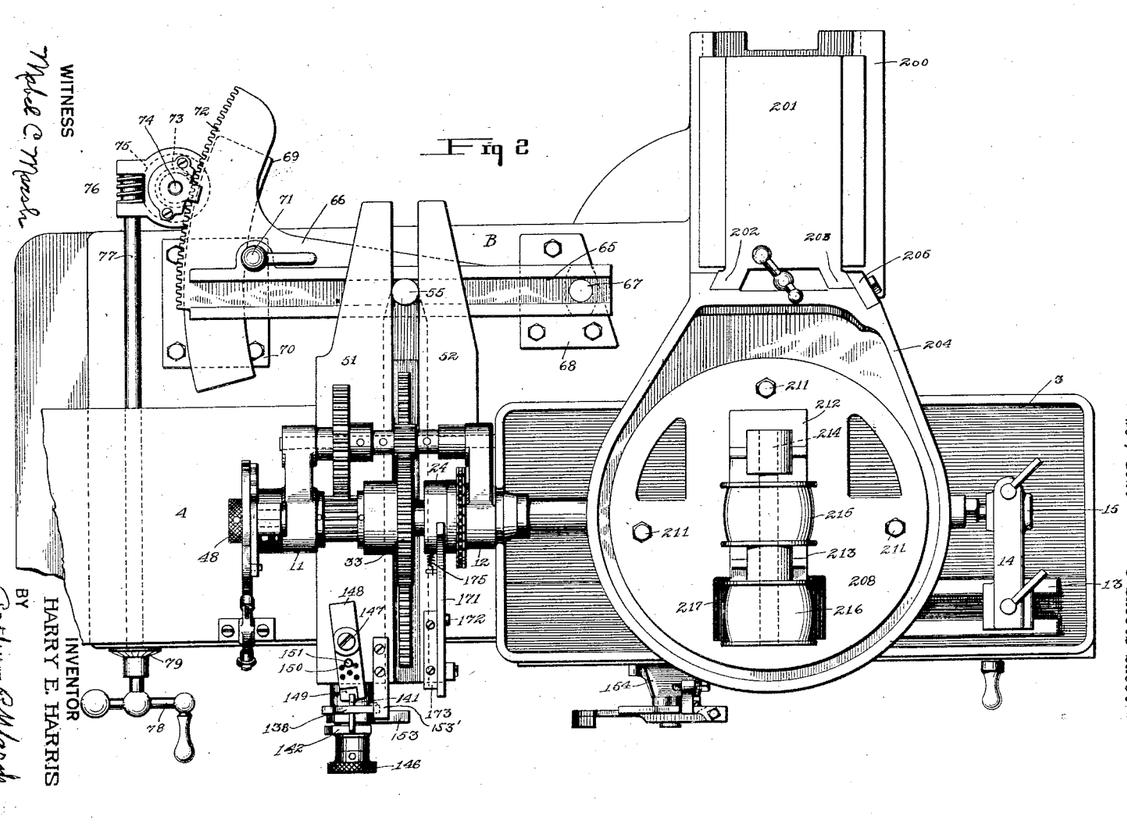
Fig. 2 is top plan partly broken way.
Figure 11:
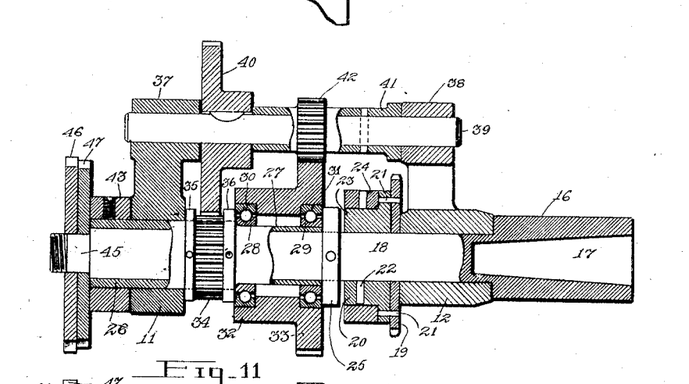
Fig. 11 is a view partly in section showing a back geared drive for the arbor shaft.

The platform portion 4 of the carriage carries spaced bearings 11 and 12 in which is journaled a live spindle mechanism by which the work may be turned to properly present the same to the operating tool. Mounted on a slideway 13 within the pan portion 3, as shown in Fig. 2, is a bracket 14 of any suitable or usual construction adjustably carrying a dead center 15 in alignment with the live spindle, the hob shown at H in Figs. 1 and 3 being centered between the live and dead centers in the usual manner. As shown more clearly in Fig. 11, the live spindle mechanism comprises a shaft 16 having at one end a taper bore 17 for the reception of a tapered center of usual construction and having a reduced portion 18. The portion 18 is journaled in the bearing 12 and is prevented from endwise movement therein by the enlarged portion 16' bearing at one end of the bearing 12 and a gear 19 bearing at the other end, this gear being pinned to a collar 20 by pins shown at 21, which collar is made fast to the portion 18 by pin 22. The collar 20 has a reduced portion 23 on which is adjustably fixed a ring 24 for a purpose which will later be described. To the left of the collar 20, a collar 25 is also made fast to the shaft portion 18. Journaled on the shaft to the left of collar 25 is a sleeve 26, the right hand portion of which is of reduced external diameter as shown at 27. This portion 27 carries a pair of rings 28 and 29 forming the inner members of a pair of ball raceways, the outer members being composed of rings 30 and 31 fixed to a drum 32 having fixed to or integral therewith a gear 33. The larger portion of the sleeve 26 has fixed thereto a smaller gear 34 having bearing collar portions 35 and 36, collar 35 engaging the right hand face of the bearing 11 and the collar 36 engaging the ball raceway rings 28 and 30. By this construction endwise play of the shaft 16 is prevented. Fixed to the bearings 11 and 12 are extensions 37 and 38 in which is journaled a shaft 39, the shaft having keyed thereto a spacing sleeve 41 which carries a smaller gear 42 meshing with the gear 31. To the left of the bearing 11 the sleeve 26 has fixed thereto a collar 43 which carries an arm 44 (see Figs. 3, 9, and 10). The left hand extremity of the shaft 16 (Fig. 11) is further reduced at 45 for the reception of a pair of toothed wheels 46 and 47 which may be retained thereon by a knurled nut 48 (see Figs. 2 and 3) threaded on the end of the portion 45.

With this construction it is evident that a given degree of turning imparted to the gear 33 will, through the back geared arrangement comprising pinion 42, gear 40 and pinion 34, transmit a much greater angular motion to the sleeve 26 than would be obtained if gear 33 were fixed thereto. If desired, however, this gear, marked 33' in Fig. 12 may be fixed to the sleeve 26' corresponding to sleeve 26 of Fig. 11 in which case the shaft 39 with its gears and bearings therefor and pinion 34 will be omitted.

Figure 3:
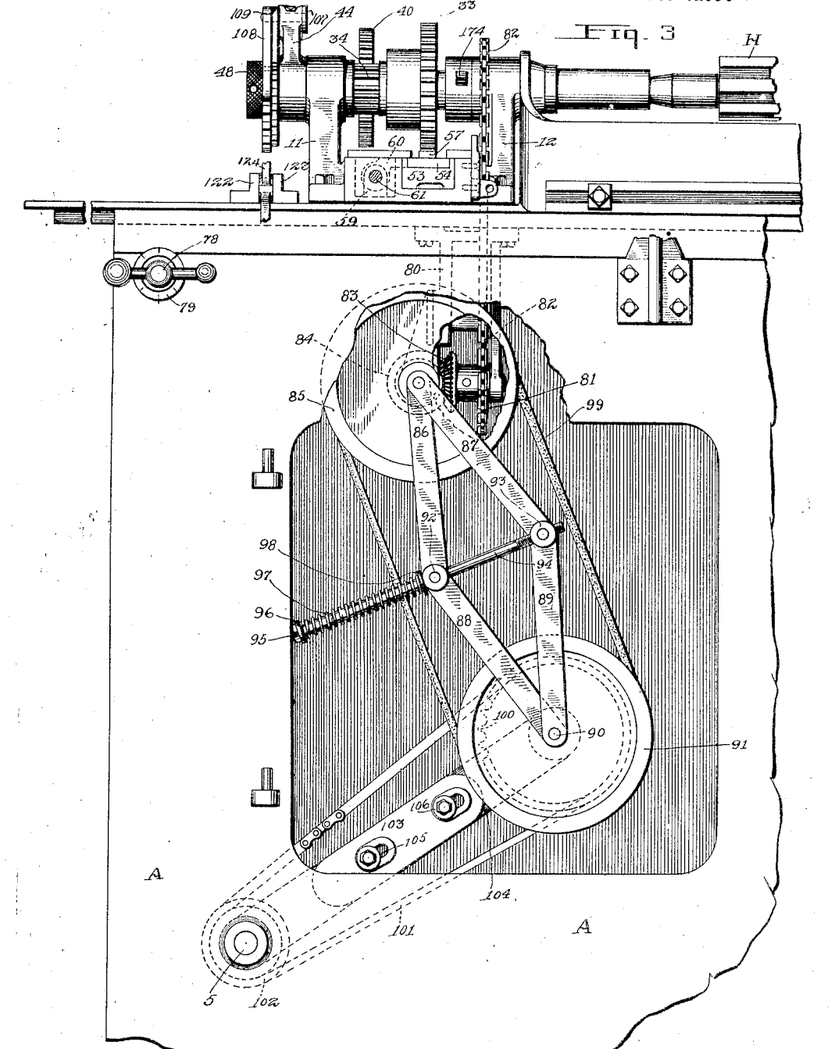
Fig. 3 is a partial front elevation with parts broken away or removed and other parts in different positions from the showing in Fig. 1.
Figure 7:
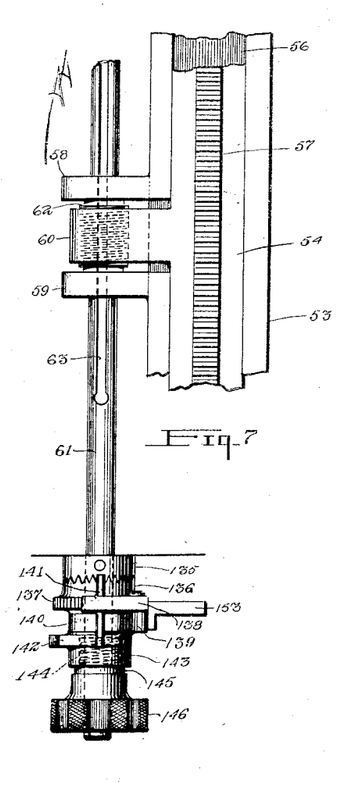
Fig. 7 is a detail of the feed slide mounting.

Carried by the platform portion 4 between the bearings 11 and 12 is a transversely extending housing 50 (see Fig. 1) surmounted by a pair of spaced cover plates 51 and 52, which extend over a pair of slides 53 and 54 which are held in place thereby. Slide 53 directly engages the housing 50 and carries at its rear end a bearing pin 55 which is guided between the coverplates 51 and 52. The slide 54 is carried by a slideway 56 (Fig. 7) longitudinally of the slide 53 and carries on its upper surface a rack 57 in position to mesh with the teeth of the gear 33. Intermediate the ends of the slide 53 are positioned outstanding spaced lugs 58 and 59 between which lugs extends a lug 60 fixed to the slide 54 lengthwise of slide 53. The lugs 58 and 59 are forked to take over a shaft 61 journaled in the housing 50 and which also passes through a threaded plug 62 engaging a threaded opening in the lug 60 and fitting between the lugs 58 and 59 (Figs. 3 and 7). Shaft 61 has a slot 63 therethrough for a considerable distance longitudinally thereof, the plug 62 having a transverse pin forming a key riding therein. By this means slide 53 carrying with it slide 54 may move freely longitudinally of the housing 50 as a unit, and by turning the shaft 61 to rotate the plug 62 slide 54 may be adjusted relative to slide 53.

The guide pin 55 (Fig. 2) extends downwardly below the coverplates 51 and 52 and engages a guide slot 65 in a spiral generating or sine bar 66 which is pivoted at 67 to a bracket 68 made fast to the machine base A. The other end of the bar rests upon a segmental guide 69 carried by a bracket 70. A locking clamp 71 of any suitable description may be employed to clamp the bar in any adjusted position on the guide 69. The free end of bar 66 terminates in a segmental rack 72 meshing with a pinion 73 carried by a vertical shaft 74. Shaft 74 carries a worm wheel, indicated by dotted line at 75 in Fig. 2, meshing with a worm 76 on a shaft 77 projecting through the base A and carrying at its forward end a hand crank 78. Adjacent the base A shaft 77 may carry an indicating disc 79 indicating to the operator the angular position of the sine bar 66.

Fixed to the underface of the carriage 2, as shown in Fig. 3 and projecting within the base A is a bracket 80 between spaced walls of which is journaled a shaft carrying a sprocket wheel 81 which is connected by means of a drive chain 82 to the gear 19. Fixed to rotate with the wheel 81 is a beveled gear 83 meshing with a similar gear 84 at right angles thereto. Fixed to rotate with the gear 84 is a grooved pulley 85, these parts being also carried by the bracket 80. Extending downwardly from the axis of the grooved pulley 85 is a pair of links 86 and 87 having pivoted at their free ends a second pair of links 88 and 89. These links are pivoted together at 90 on the axis of a grooved belt pulley 91. The pivotal connections between the links 86 and 88 and 87 and 89 respectively carry a pair of perforated bosses 92 and 93 through which passes a rod 94 which is screw threaded in the boss 93 and passes loosely through the boss 92. Rod 94 terminates at one end in a squared head 95 against which bears a washer 96. A coil spring 97 surrounds the rod 94 and engages between the washer 96 and a washer 98 abutting the lug 92. A belt 99 preferably of triangular cross section passes about the grooved pulleys 85 and 91 and may be tightened by turning the rod 94 in a direction to increase the tension of the spring 97 which urges the bosses 92 and 93 together thus increasing the spacing of the pulley axes. Fixed on the same axis with the pulley 91 is a sprocket wheel 100 which is driven by a chain 101 from a sprocket wheel 102 carried by the main drive shaft 5 within the base A. The axis of the sprocket wheel 100 is held at a proper distance from the shaft 5 by means of a pair of links 103 and 104 journaled on the shaft 5 and the axis 90 respectively and retained adjustably in alignment with each other by bolt and slot connections shown at 105 and 106. This construction imparts a frictional drive connection from the main shaft 5 to the gear 19, through the frictional engagement of the belt 99 with the pulleys 85 and 91, in all positions of traverse of the carriage 2. This driving connection serves to impart rotary movement to the hob, both to effect its feed to the tool and to prevent lost motion in its oscillatory movement as determined by the setting of the sine bar according to the degree of spiral of the hob, in a manner which will presently be described.

Figures 9, 10:
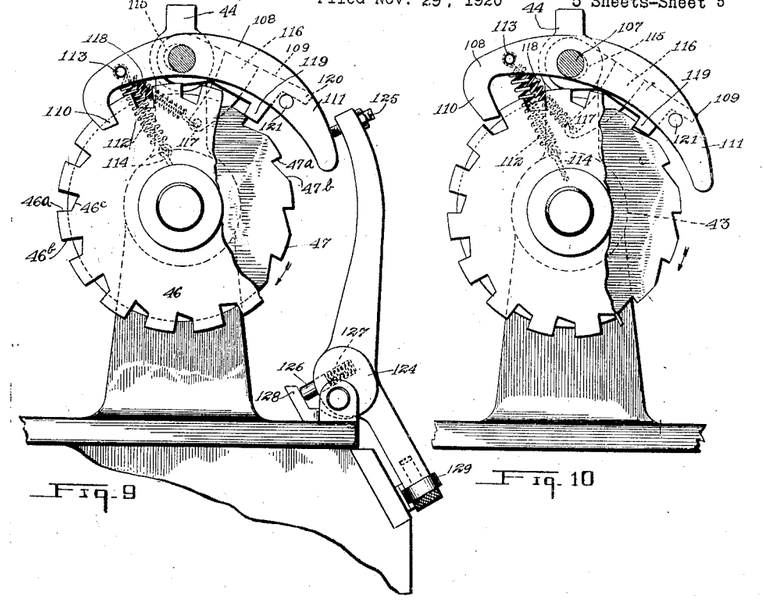
Figs. 9 and 10 are fragmentary end views showing the arbor shaft and different positions of the indexing mechanism.

In order to retain the hob in correct position to the tool against the tendency of the friction drive to turn the same, and to allow the same to turn on successive traverses in order to operate on the circumferentially adjacent teeth, a novel indexing mechanism has been provided. The left hand end of the spindle 18, as before noted, carries fixed thereto by means of the knurled nut 48 a pair of toothed wheels 46 and 47. These wheels have the same number of teeth, which number is equal to the number of cutting elements circumferentially of the hob. The teeth of the disc 47 are shorter than those of the disc 46 and each has a straight forward face $47^a$ and an inclined rear face $47^b$. Each tooth of the disc 46 has nearly radial forward and rear faces $46^a$ and $46^b$ joined by an inclined portion $46^c$. Between the bearing 11 and the disc 47, as before noted, a collar 43 is made fast to the sleeve 26, this collar carrying an arm 44. The outer end of this arm carries a pivot pin 107 for a pair of pawls 108 and 109 (Figs. 3, 9 and 10). The pawl 108 terminates at one end in a lock lug 110 shaped to fit the spaces between the teeth of the disc 46, the other end of this pawl terminating in an extended arm 111. A coil spring 112 engages at one end on a pin 113 fixed to the pawl 108 near the lug 110 and at its other end is fixed to an eye bolt 114 made fast to the collar 43. The pawl 109 has an elongated slot 115 at one end through which passes the pivot 107 and also carries a depending arm 116 having an eye 117 at its lower end for engagement with the spring 118, the other end of which engages the pin 113, this spring serving normally to hold the pawl 109 with the inner end of the slot 115 in engagement with the pivot 107. Pawl 109 also carries a latch lug 119 for engagement with the teeth of the wheel 47 and carries a tail portion 120 adapted to ride on a pin 121 carried by the portion 111 of the pawl 108.

Fixed to the platform portion 4 (Fig. 3) is a pair of upstanding lugs 122 and 123 between which is pivoted a lever 124. At the upper end this lever carries an adjustable screw abutment 125 in position to contact with the outer face of the portion 111 to depress the same at suitable times to retract the lock lug 110 from between the teeth of the wheel 46. The upper end of lever 124 is normally held back from the portion 111 by means of a pin 126 slidably mounted therein adjacent its pivot and urged outwardly by means of a spring 127 seated in a socket in the lever into impinging contact with a stationary abutment 128. At the lower end of the lever 124 is carried a cam roller 129. On Fig. 1 at 130 is shown a cam block fixed to the guideway 1 in position to be engaged by the roller 129 to force the same outwardly and unlock the pawl 108 on traverse of the carriage to the right.

Figures 4, 5, 8:
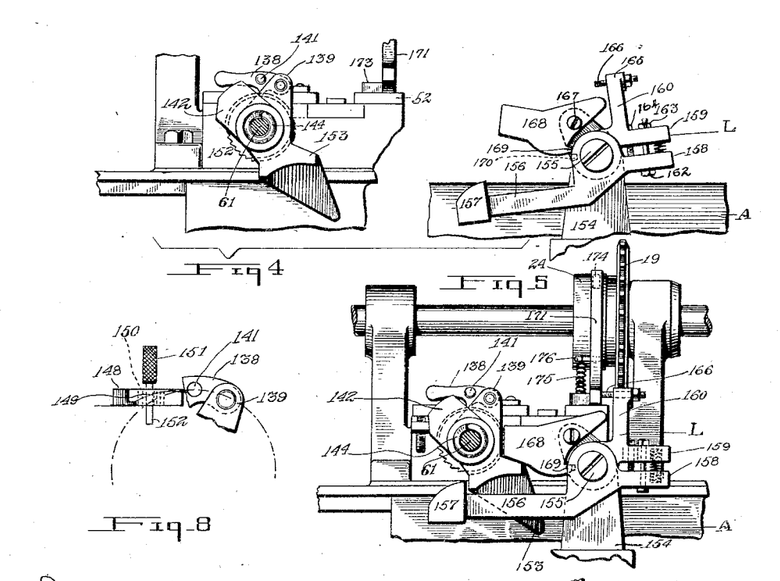
Figs. 4, 5, and 6 are fragmentary front elevations showing different positions of the automatic feed actuating mechanism.
Fig. 8 is a detail of a pawl release.

The outer end of the shaft 61 carries a portion of an automatic feed device as follows: Fixed to the shaft 61 (Fig. 7) and bearing against the front of the casing 50 is a friction clutch element 135, and journaled on the shaft 61 in clutching relation thereto is a mating member 136 having fixed thereto or integral therewith a ratchet wheel 137. A pawl 138 engaging this ratchet is pivoted to an outwardly extending projection 139 of a collar 140 journaled on shaft 61. A pin 141 passes through the pawl 138 at its outer end and may ride up on a cam 142 carried by a collar 143 journaled on the shaft 61. Seated within a housing in the collar 143 and bearing at one end thereagainst is a coil spring 144 which bears at its other end on the reduced portion 145 of a hand wheel 146 made fast to the shaft 61, the reduced portion 145 extending within the housing of collar 143. The cam portion 142 may be turned by hand against the friction of the spring 144 relative to the handwheel 146, this spring serving at the same time to yieldingly hold the clutch members 135 and 136 in engagement. Pivoted to the coverplate 51 of the housing 50 at 147 (Fig. 2) is a pawl release member 148 having at its outer end an inclined cam surface 149 (Figs. 2 and 8) up which the rear end of the pin 141 may ride on rotation of the collar 140 in a clockwise direction to raise the pawl from engagement with the ratchet wheel 137. A series of perforations shown at 150 pass through the forward portion of the release member 148, and a pin 151 having a reduced lower extremity 152 as shown in Fig. 8 may pass through any selected perforation and into a mating perforation in the coverplate 51, the perforations therein being so related to the perforation 150 as to provide fine adjustment of member 148 about its pivot 147 by which the cam portion 149 may be adjusted to release the pawl 138 earlier or later. Collar 140 is also provided with a second extended portion 153 (Figs. 4, 5, and 6) which serves as a weighted lever by which this collar carrying the feed pawl 138 may be rocked about the axis of shaft 61 a fixed stop 153' limiting this rocking motion in a clockwise direction. For the purpose of rocking this lever in the other direction to feed the work a gun lock device indicated generally at L is fixed to the frame of the machine. This mechanism comprises a bracket 154 fixed to the forward face of the machine base A substantially opposite the collar 24 carried by the live spindle when the carriage is at its limit of traverse to the right. Pivoted at 155 on the bracket 154 is a tripping lever 156 having a weighted latch portion 157 at its left hand extremity. Its right hand extremity 158 is spaced directly below a similar portion 159 carried by a lever 160 also journaled on the pivot 155 immediately back of the tripping lever 156. A spring 161 is interposed between the portions 158 and 159 to force the same apart as far as is permitted by a bolt 162 carried by the portion 158 and projecting through the portion 159 and surmounted by an adjusting nut 163. A set screw 164 is adjustably fixed in the portion 159 and projects toward the portion 158 to determine the minimum distance of separation therebetween. The lever 160 has an upwardly extending portion 165 in which is adjustably fixed a contact screw 166 for a purpose to be later described. Pivoted above the point 155 of the bracket 154 at the point 167 is a cocking finger 168 carrying at its lower end a lug 169 adapted to engage in a notch 170 of the lever 160 to hold the same in raised position. For actuation of the gunlock device an engagement lever 171 (Figs. 2, 4, 5 and 6) is pivoted at 172 to a bracket 173 carried by the cover plate 52 immediately in line with the adjustable collar 24 carried by the work spindle. This collar 24 carries a projecting lug 174 as shown in Figs. 3 and 5 which may contact with the inner end of the lever 171 during each rotation of the live spindle to depress the outer end of this lever to impinge against the screw 166 of the lever 160, the parts being so adjusted that when the outer end of the lever 171 is in this position the traverse of the carriage is sufficient to raise the tripping lever 156 into its horizontal position where it may be retained by the cocking finger 168, lug 169 of which will engage in the notch 170 to retain the lever 160 in position and with it the tripping lever 156. The parts are so proportioned however, that when the outer end of lever 171 is in raised position the screw 166 will not be contacted and the lever 156 will be unaffected by the traverse of the carriage. Lever 171 is normally retained out of contacting position by means of a spring 175 (Figs. 2 and 5) engaging at one end a pin 176 made fast thereto and at its other end made fast to the cover plate 52.

Extending rearwardly from the machine base A is a horizontal slideway 200 (Fig. 2) in which is mounted a block 201 the forward face of which is formed with flaring guide portions 202—203 for slidably supporting a grinder head 204, a detachable plate 205 carried thereby and overlapping the portion 203 holding the parts assembled. Any suitable means may be provided for adjusting the block 201 forwardly and rearwardly in the guideway 200 and the head 204 vertically with relation to the block 201. The head 204 is provided with an internal circular flange 206 (Fig. 1) having a marginal shoulder 207. A disc 208 is seated within the shoulder 207 on the upper surface of the flange 206 and has a portion 209 of reduced diameter bearing against the inner face of the flange 206. Spaced retaining fingers 210 having threaded shanks passing upwardly through the disc 208 engage beneath the flange 206 and are retained in position by nuts 211. These parts are so related that on loosening the nuts 211, disc 208 may be rotated relative to the flange 206, and on tightening the nuts 211, disc 208 will be fixed in position. On the upper face of disc 208 is carried a pair of spaced bearing 212 and 213 in which is journaled a shaft 214 having fixed thereto belt pulleys 215 and 216, the belt pulley 215 being located in the axis of the disc 208. Beneath the pulley 216 is a slot 217 through the disc 208. On the under side of the disc 208 is a shaft 218 arranged parallel to the shaft 214 and journaled in a pair of bearings one of which is shown at 219 in Fig. 1. Shaft 218 carries a pulley indicated in dotted lines at 220 in Fig. 1 beneath the slot 217 for connection by belt with the pulley 216. Substantially at the axis of the disc 208 a grinding wheel 221 is fixed to the shaft 218, a sheet metal guard 222 being preferably provided therefor. The pulley 215 is connected by a belt 223 to any suitable over head counter shaft. By this construction it is evident that disc 208 may be turned to change the angle of the grinding wheel plane without disturbing the driving connection with the overhead countershaft as this connection remains always in the axis of pivotal movement.

Figure 12:
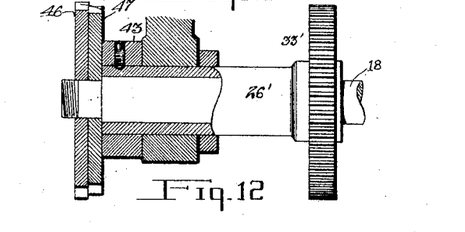

The operation of this machine is as follows:

The hob to be ground is inserted between the live and dead centers and is fixed to rotate with the live spindle. The tool carrying head is adjusted so that the grinding tool will be properly presented to the work by the horizontal and vertical adjustments provided for the tool carrying head and the angular adjustments provided by the mounting of the disc 208. If the teeth are arranged in right or left spiral formation crank 78 is turned to bring the indicator 79 to the proper reading, by which action the sine bar 66 will be swung to the proper angle about its pivot 67 to give the required turning movement to the hob during the traverse of the carriage 2. Indexing wheels 46 and 47 having the same number of teeth circumferentially as the hob are fixed in position. The hand wheel or knob 146 is turned to insure that the slide 54 is near its extreme forward position relative to the slide 53. These adjustments are preferably made while the carriage is near its left limit of traverse with the grinding wheel out of contact with the work, the limit of traverse in this direction being preferably adjustable by any suitable means to provide for any varying lengths of work. On starting the machine in operation the carriage 2 moves to the right carrying the work past the grinding wheel in position to make a cut thereon. If the hob is a spiral the sine bar 66 is so adjusted that the pin 55 moves backward or forward depending upon the direction of spiral during the traverse of the carriage to cause the wheel to cut parallel spiral paths on circumferentially adjacent teeth. This action moves the slide 54 together with the slide 53, these parts being held against relative movement by engagement of the lug 60 with the threaded plug 62 carried between the lugs 58 and 59. Travel of the slide 54 moves the rack 57 meshing with the gear 33 which, acting through the back gears 42 and 40, turns the gear 44 to a greater extent and imparts turning movement to the sleeve 26 and, through the pawl 108 pivoted on the collar 43 and engaging the indexing wheel 46, to the central spindle 18, thus causing the hob to be turned during the traverse of the work. At the same time the sprocket wheel 21 is urged to turn in one direction by means of its connection through the friction drive, comprising grooved pulleys 85 and 91 and the belt 99, from the main drive shaft 5, slipping taking place between belt 99 and the respective pulleys. This action holds the pin 55 firmly against one wall of the slot in the sine bar during both directions of traverse and thus prevents lost motion of the parts, it being evident that the hob will be rotated alternately on opposite directions of traverse. In case the mechanism of Fig. 12 is employed, rotation of the gear 33 will be imparted directly to the sleeve 26 instead of having an increased motion given thereto, the back geared arrangement of Fig. 11 merely serving to increase the extent of rotating movement imparted to the hob during the traverse for any particular setting of the sine bar. Of course when the sine bar is in midposition, rack bar 57 will remain stationary during the traverse and no rotation of the hob will be produced thereby. As the carriage nears the completion of its stroke to the right cam roll 129 rides up on the cam 130 and depresses the end 111 of the pawl 108 retracting the lock lug 110 from engagement with the notch of the wheel 46. At the same time the pin 121 carried by the portion 111 retracts from contact with the tail portion 120 of the pawl 116, whereupon the spring 118 moves its latch lug 119 into contact with the periphery of the wheel 47 in position to engage with the teeth thereof. As soon as the locking lug 110 has been removed from locking engagement with the wheel 46 the shaft 18 is free to turn independently of the sleeve 26, this action immediately taking place by reason of the friction drive acting on the sprocket wheel 19. As soon as such motion takes place, the latch lug 119 rides down behind the succeeding tooth on the wheel 47, the portion 47ᵃ thereof engaging the lug 119 and carrying the pawl 116 therewith to the limit of its movement on the pin 107 against the tension of the spring 118, as shown in Fig. 10, at which time the wheel 47 is prevented from further movement, preventing further rotation of the shaft 18 relative to the sleeve 26. In this position of the parts the wheel 46 has been rotated the distance of one tooth relative to the lock lug 110 so that when the cam roll 129 has been moved out of contact with the cam 130 on the return traverse of the carriage, spring 112 draws the locking lug 110 into locking engagement with the wheel 46 at the same time raising the latch lug 119 from the wheel 47. By this construction it is seen that by each traverse of the carriage the shaft 18, to which the hob is fixed, is allowed to rotate circumferentially the distance from one tooth of the hob to the next, so that each complete cutting traverse will be effected on succeeding circumferentially arranged hob teeth. It is also clear that the locking pawl 108 serves only to lock the hob in position, while the pawl 116 serves to stop its rotation in the proper place for the locking pawl 108 to come into engagement. By this means the locking lug is relieved of the stress of stopping the rotation of the hob in passing from one tooth to the next and merely serves to lock the parts in position so that it may function with great accuracy as it is not subjected to any considerable wear or shock.

Figure 6:
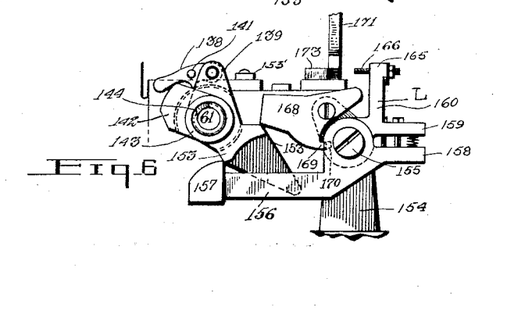

When a cut has been taken on all the hob teeth it is important that an additional movement be given to the hob in order to feed the same to the tool that a cut may be made on the next succeeding series of traverses on the entire set of hob teeth. For this purpose the feed mechanism shown in detail in Figs. 4 to 8 has been provided. Once in each complete rotation of the hob, or oftener if it is desired to feed oftener, the lug 174 (or more than one such lug if oftener feed is desired) carried by the collar 24 of the live spindle lifts the inner end of the lever 171, depressing the outer end thereof so that on the traverse of the carriage it impinges on the adjustable screw 166 carried by the pivoted lever 160 and moves the same to the right. This action, through the connections with the release lever, raises the outer weighted end 157 thereof into position shown in Fig. 5. In this position the locking lug 159 of the cocking finger 168 falls into the notch 170 of the lever 160 and holds the same in position. By the time the screw 166 has been contacted and the tripping lever 156 raised, the extended portion 153 has been moved to the right of the weighted portion 157, so that on return traverse it will be engaged thereby and turned as shown in Fig. 6. The pawl 138 is therefore caused to engage and turn the ratchet teeth 137 which, through the slip clutch elements 136 and 135, turns the shaft 61. This action turns the threaded plug 62 and through its engagement with the lug 60 moves the same, relative to the lugs 58 and 59 and therefore causes relative movement between the slides 54 and 53. This action moves the gear 33 and, either through the back gears or directly depending upon the construction used, moves the sleeve 26 thus rocking the pivot 107 of the locking pawl 108 about the axis of the shaft 18 and allowing the friction drive to the sprocket wheel 21 to turn the shaft 18, and consequently the hob, slightly, to impart a feed movement to the hob relative to the grinding wheel. The turning movement of the lever 153 serves to engage the same with the under surface of the cocking finger 168 and raises the same to release the lug 169 from the notch 170 which allows the tripping lever 156 to drop to the position shown in Fig. 4. The weight of portion 153 then returns pawl 138 to its former position with extension 139 in contact with the stop 153'. In order to regulate the extent of feed motion the pawl release plate 148 is provided having the cam face 149 up which the rear end of the pin 141 of the pawl 138 rides to raise the same out of contact with the ratchet wheel 137. In order to regulate the total extent of feed movement the cam portion 142 angularly adjustable on the shaft 61 is provided. When the shaft 61 is rotated as far as desired, further rotation thereof moves this cam portion under the forward end of the pin 141 to retain the pawl 138 out of engagement with the ratchet wheel 137. Thereafter rocking movement imparted to the lever 153 will have no effect to turn the ratchet wheel 137 and will therefore fail to turn the shaft 61 and impart feed motion to the slide 54. The spring clutch comprising the clutch elements 135 and 136 act as a safety device to prevent breaking of the parts should the slide 54 have reached the limit of its feed motion, as through an error in setting the machine, prior to the action of the cam 142 in raising the pawl 138 to stop the feed of the machine. Should the operator by any chance raise the tripping lever 156 into feed position while the lever 153 is at the left of the weighted portion 157 the spring 161 between the release lever and the lever 160 allows the tripping lever 156 to be depressed relative to the portion 160 by engagement of the lever 153 with the portion 157, the lever 160 being at that time held locked by the cocking finger 168 its lug 169 being in engagement with its notch 170.

Having thus described the invention together with specific embodiments thereof, it should be evident to one skilled in the art that various modifications and changes might be made without departing from the spirit or scope of the invention as defined by the appended claims.

1. In a machine of the class described, a traversing work carriage, a work spindle carried by said carriage, a slide carried by said carriage and movable transversely thereof, a second slide carried by said first slide, means to operatively connect said second slide to said spindle whereby motion of said slide turns said spindle, means normally holding said slides for simultaneous motion, means for moving said first slide while said slides are so held, and means for moving said second slide independently of said first slide.

2. In a machine of the class described, a traversing work carriage, a work holding spindle carried by said carriage, a slide carried by said carriage and movable transversely thereof, means actuated by the traverse of said carriage to move said slide, a second slide normally movable with said first slide, operative connections between said second slide and said spindle whereby sliding of said slide rotates said spindle, and means acting periodically to move said second slide relative to said first slide to impart rotary movement to said spindle independent of the rotation imparted thereto by the traverse of said carriage.

3. In a machine of the class described, a traversing work carriage, a work holding spindle carried by said carriage, a slide carried by said carriage and movable transversely thereof, a second slide carried by said first slide, a shaft carried transversely of said carriage, a threaded member slidably and non-rotatably related to said shaft and mounted for sliding movement with said first slide, a member fixed to said second slide and engaging the threads of said member whereby rotation of said shaft moves said second slide relative to said first slide, a gear carried by said spindle, a rack meshing with said gear and carried by said second slide, means to move said first slide to an adjustable extent on the traverse of said carriage to rock said spindle, and means acting periodically to turn said shaft to impart an additional work feeding motion to said spindle.

4. In a machine of the class described, a traversing work carriage, a work spindle carried longitudinally thereof, a feed shaft carried laterally of said carriage, operative connections from said feed shaft to said spindle whereby rotation of said shaft rotates said spindle, mechanism for rotating said shaft, and means actuated by the traverse of said carriage for intermittently actuating said mechanism.

5. In a machine of the class described, a traversing work carriage, a work spindle carried by said carriage, a feed shaft carried by said carriage and operatively related to said spindle to impart rotary work feeding movement thereto, a ratchet mechanism for intermittently rotating said shaft, and adjustable means for determining the amplitude of effective stroke of said mechanism.

6. In a machine of the class described, a traversing work carriage, a work spindle carried by said carriage, a feed shaft carried by said carriage and operatively related to said spindle to impart work feeding movement thereto, a ratchet mechanism for intermittently rotating said shaft, adjustable means for determining the amplitude of effective stroke of said mechanism, and means for rendering said mechanism inoperative after a predetermined total extent of feed motion.

7. In a machine of the class described, a traversing work carriage, a work spindle carried by said carriage, a feed shaft carried by said carriage and operatively related to said spindle to impart work feeding movement thereto, means acting independently of said feed shaft to rotate said work spindle, and means actuable at a predetermined point in said independent rotation to actuate said feed shaft.

8. In a machine of the class described, a traversing work carriage, a work spindle carried by said carriage, means to oscillate said spindle on the traverse of said carriage, means to rotate said spindle a predetermined amount intermittently independent of said oscillations, and means to impart work feeding movement to said spindle independently of said other movements.

9. In a machine of the class described, a work spindle, means to rock said spindle, means to rotate said spindle, and other means to rotate said spindle.

10. In a machine of the class described, a work spindle, means to rock said spindle, mechanism to rotate said spindle intermittently, and other means acting at intervals of different length than said mechanism to rotate said spindle.

11. In a machine of the class described, a traversing carriage, a work spindle having its axis parallel to the line of traverse of said carriage rotatably carried by said carriage, means to oscillate said spindle to an adjustable extent during the traverse of said carriage, a tool operatively related to work carried by said spindle, and means carrying said tool and adjustable to position said tool along the line of operation thereof as determined by the length of traverse and extent of oscillation of the work.

12. In a machine of the class described, a traversing carriage, a work spindle rotatably carried by said carriage about an axis parallel to the direction of traverse of said carriage, means to oscillate said spindle to an adjustable extent during said traverse to conform to spiral work, a tool support adjacent the path of traverse of said carriage, a disc rotatably carried by said support, a drive pulley positioned in the axis of said disc, a grinding wheel rotatably carried by said disc in position to operate on work carried by said spindle, means for driving said wheel from said pulley, and means for adjusting the angular position of said disc to position said wheel to conform to the pitch of spiral of the work carried by said spindle.

13. In a machine of the class described, a support, a perforated disc rotatably mounted on said support, shafts arranged in parallel relation on opposite sides of said disc, a grinding wheel and a pulley fixed to one shaft, a pair of pulleys fixed to the other shaft, one of said pulleys being in line with the axis of said disc and the other pulley being opposite the pulley of said first shaft, and a belt passed over said oppositely positioned pulleys and passing through the perforation of said disc.

14. In a machine of the class described, a work spindle, a feed shaft, connections from said shaft to said spindle whereby rotation of said shaft imparts feed movement to said spindle, a member actuable to rotate said shaft, a gravity latch lever engageable with said member to actuate the same, means to move said lever into engaging position, and means to hold said lever in engaging position until after it has actuated said member.

15. In a machine of the class described, a traversing carriage, a work spindle rotatably carried by said carriage, a feed shaft carried by said carriage and operatively related to said spindle, means to rotate said spindle, a feed lever pivoted on said feed shaft, a member carried by said feed lever and engaging said shaft for rotating said shaft by rocking said lever, a tripping lever movable into the path of said feed lever to engage and rock said feed lever on subsequent traverse of said carriage, a lug on said spindle, and an engagement lever engageable by said lug on rotation of said spindle and movable thereby into operative engagement with said tripping lever on traverse of said carriage to move said tripping lever into the path of said feed lever.

16. In a machine of the class described, a traversing carriage, a work spindle rotatably carried by said carriage, a feed shaft carried by said carriage and operatively related to said spindle, means to rotate said spindle, a feed lever pivoted on said feed shaft, a member carried by said feed lever and engaging said shaft for rotating said shaft by rocking said lever, a tripping lever pivoted at a fixed point and movable into the path of said feed lever to engage and rock the same on subsequent traverse of said carriage, a lug on said spindle, an engagement lever engageable by said lug on rotation of said spindle and movable thereby into operative engagement with said tripping lever on traverse of said carriage to move said tripping lever into the path of said feed lever, and a cocking lever gravity actuated to lock said tripping lever in engaging position and movable to releasing position by engagement by said feed lever after each feeding motion thereof.

17. In a machine of the class described, a traversing carriage, a feed shaft on said carriage, a feed lever pivoted to said shaft and actuable to rock said shaft to feed work, a tripping lever pivoted at a fixed point and engageable with said feed lever to impart feed motion thereto on subsequent traverse of said carriage, and automatically acting means for periodically moving said tripping lever into engaging position.

18. In a machine of the class described, a traversing carriage, a feed shaft on said carriage, a feed lever pivoted to said shaft and actuable to rock said shaft to feed work, a tripping lever pivoted at a fixed point and engageable with said feed lever to impart feed motion thereto on subsequent traverse of said carriage, means for periodically moving said tripping lever into engaging position, and means releasable by movement of said feed lever for retaining said tripping lever in engaging position.

19. In a machine of the class described, a traversing carriage, a feed shaft on said carriage, a feed lever pivoted to said shaft and actuable to rock said shaft to feed work, a tripping lever pivoted at a fixed point and engageable with said feed lever to impart feed motion thereto on subsequent traverse of said carriage, means for periodically moving said tripping lever into engaging position, means releasable by movement of said feed lever for retaining said tripping lever in engaging position, and means permitting said tripping lever to yield from engaging position under abnormal conditions.

20. In a machine of the class described, a work spindle, a feed shaft operatively related to said spindle, means to rotate said work spindle, and means actuated at definite angular positions of said spindle for actuating said feed shaft.

21. In a machine of the class described, a traversing carriage, a work spindle carried by said carriage, a feed shaft carried by said carriage and operatively related to said spindle, means to rotate said spindle, and means actuated by the traverse of said carriage at definite angular positions of said spindle for actuating said feed shaft.

22. In a machine of the class described, a traversing carriage, a work spindle carried by said carriage, a feed shaft carried by said carriage and operatively related to said spindle, means to oscillate said spindle during the traverse of said carriage, means to rotate said spindle by definite steps adjacent one end of each traverse, and means actuated periodically to actuate said feed shaft.

23. In a machine of the class described, a work spindle, means to oscillate said spindle, means to turn said spindle periodically in one direction, and means acting less often than said turning means for further turning said spindle.

24. In a machine of the class described, a traversing carriage, a work spindle carried by said carriage, means actuated by the traverse of said carriage for oscillating said spindle, means tending to turn said spindle, means to hold said turning means inoperative and periodically acting to permit turning through definite intervals, and means actuated by the traverse of said carriage at certain times to impart an additional turning motion to said spindle.

25. In a machine of the class described, a traversing work carriage, a work spindle rotatably carried by said carriage, mechanism tending to rotate said spindle continuously, means actuated by the traverse of said carriage for turning said spindle, devices for rendering said mechanism ineffective to rotate said spindle, and means for causing said devices to be inoperative.

26. In a machine of the class described, a traversing work carriage, a work supporting spindle carried by said carriage, mechanism tending to rotate said spindle, means actuated by the traverse of said carriage for turning said spindle, devices for rendering said mechanism ineffective to rotate said spindle, and means automatically actuated periodically to cause said devices to be inoperative and allow said spindle to turn a predetermined extent.

27. In a machine of the class described, a traversing carriage, a work spindle carried by said carriage, means constantly tending to rotate said spindle continuously, means to prevent such rotation, and means actuated by the traverse of said carriage to release said preventing means to permit rotation of said spindle to a definite extent.

28. In a machine of the class described, a work spindle, a sleeve journaled on said spindle, means normally limiting said sleeve to a predetermined extent of rocking motion, means tending to rotate said spindle, and an indexing mechanism normally locking said sleeve and spindle for simultaneous motion and actuable to allow relative rotation of said sleeve and spindle periodically to a definite extent.

29. In a machine of the class described, a traversing carriage, a work spindle carried by said carriage, a sleeve journaled on said spindle, means normally limiting said sleeve to a predetermined extent of rocking motion, means tending to rotate said spindle, and an indexing mechanism normally locking said sleeve and spindle for simultaneous motion and actuable at each traverse of said carriage to allow relative rotation of said sleeve and spindle to a definite extent.

30. In a machine of the class described, a work spindle, a sleeve journaled on said spindle, means normally limiting said sleeve to a predetermined extent of rocking motion, means tending to rotate said spindle, an indexing mechanism normally locking said sleeve and spindle for simultaneous motion and actuable to allow relative motion of said sleeve and spindle periodically to a limited extent, and means for periodically imparting rotation of predetermined extent to said sleeve.

31. In a machine of the class described, a traversing carriage, a work spindle carried by said carriage, a sleeve journaled on said spindle, means normally limiting said sleeve to a predetermined extent of rocking motion, means tending to rotate said spindle, an indexing mechanism normally locking said sleeve and spindle for simultaneous motion and actuable at each traverse of said carriage to allow relative rotation of said sleeve and spindle to a definite extent, and means for periodically imparting rotation of predetermined extent to said sleeve.

32. In a machine of the class described, a work spindle, means constantly tending to rotate said spindle, a sleeve carried by said spindle, means for controlling the rotation of said sleeve, means for locking said spindle in any of a plurality of rotary positions relative to said sleeve, means to render said locking means inoperative, and means acting while said locking means is inoperative for yieldingly controlling the rotation of said spindle relative to said sleeve and stopping it in a succeeding locking position.

33. In a machine of the class described, a rotary work spindle, means tending to rotate said spindle, a pair of toothed wheels carried by said spindle, a pawl engageable with the teeth of one of said wheels to lock said spindle from rotation, and a pawl engageable with the other of said toothed wheels and acting to stop the rotation of said spindle when said first pawl is out of locking position.

34. In a machine of the class described, a rotary work spindle, means tending to rotate said spindle, means to hold said spindle from rotation, means to release said holding means, and means acting while said holding means is released for cushioning and stopping the rotation of said spindle in position to be subsequently held by said locking means.

35. In a machine of the class described, a work spindle, means tending to rotate said spindle, a pair of toothed wheels fixed to said spindle, a locking pawl normally engaging between adjacent teeth of one of said wheels to prevent rotation of said spindle, a feeding pawl engaging the teeth of the other of said wheels and mounted for a limited yielding bodily movement, means tending to hold said feeding pawl in engagement with its wheel, means carried by said locking pawl for retaining said feeding pawl out of engagement with its wheel when said locking pawl is in locking position but permitting such engagement when said locking pawl is out of locking position, and means for moving said locking pawl out of locking position to permit said feeding pawl to engage its wheel and to yield bodily to permit rotation of said spindle into position for locking engagement between next adjacent teeth by said locking pawl.

36. In a machine of the class described, a work spindle, means tending to rotate said spindle, a pair of toothed wheels carried by said spindle, a pivoted pawl normally engaging between adjacent teeth of one of said wheels to prevent rotation of said spindle, a second pawl positioned to engage the teeth of the other of said toothed wheels, means carried by said first pawl for holding said second pawl out of engagement with its wheel when said first pawl is in engagement between adjacent teeth of its wheel, means tending to hold said pawls in engagement with their respective wheels, and means for moving said first pawl out of engagement with its wheel.

37. In a machine of the class described, a work spindle, means tending to rotate said spindle, a pair of toothed wheels carried by said spindle, a pawl normally engaging between adjacent teeth of one of said wheels to prevent rotation of said spindle, means to move said pawl out of such engagement, and means acting on the other of said toothed wheels when said pawl is moved out of such engagement for permitting rotation of said spindle to an extent to position said first wheel for subsequent engagement between next succeeding teeth by said pawl.

38. In a machine of the class described, a traversing carriage, a work spindle carried thereby, a drive shaft, a pair of pivoted links pivotally connecting said carriage and and shaft, a friction transmission carried by said links and operatively connecting said shaft and spindle, means to hold said spindle from rotation, means for rendering said holding means inoperative, and means acting while said holding means is inoperative to allow a limited motion of said spindle.

39. In a machine of the class described, a traversing carriage, a work spindle carried thereby, a drive shaft, a link pivoted at one end on said shaft, a lazy tongs pivoted between the free end of said link and said carriage, a grooved pulley carried by each end of said lazy tongs, driving connections from one of said pulleys to said spindle, driving connections from the other of said pulleys to said shaft, an endless belt connecting said pulleys, means to adjust the spread of said lazy tongs to adjust the tension of said belt, and an indexing mechanism for periodically permitting a predetermined amount of angular rotation of said work spindle by the action of said belt and driving connections from said drive shaft.

40. In a machine of the class described, a work spindle, a gear mounted thereon, means to turn said gear, and driving connections from said gear to said spindle acting to impart a different angular rotation to the spindle than is imparted to said gear.

41. In a machine of the class described, a traversing work carriage, a work spindle carried by said carriage, a pair of slides, connections from one of said slides for rotating said spindle on sliding thereof, and means for connecting said slides whereby the movement of the other of said slides may rotate said spindle.

42. In a machine of the class described, a traversing carriage, a work spindle carried by said carriage, a tool positioned to operate on work carried by said spindle as the carriage is traversed, means to rotate said spindle step by step at the end of the traverse of said carriage, and means acting at the end of certain only of the traverses for imparting a further rotative movement to said spindle.

43. In a machine of the class described, means for supporting a hob, a cutting tool, means for imparting a relative traverse between said supporting means and tool to effect a cut axially of the hob, means acting periodically on said supporting means to turn the hob about its axis through an angle corresponding to the distance between adjacent circumferentially arranged teeth thereon, and means acting periodically to further rotate said supporting means to effect a relative feed movement between the teeth of the hob and said tool.

44. In a machine of the class described, means for supporting a hob, a cutting tool, means for imparting a relative traverse between said supporting means and tool to effect a cut axially of the hob, means acting periodically on said supporting means to turn the hob about its axis through an angle corresponding to the distance between adjacent circumferentially arranged teeth thereon, means acting periodically to further rotate said supporting means to effect a relative feed movement between the teeth of the hob and said tool, and means acting to oscillate the work support during its traverse to effect spiral cuts on the hob.

In testimony whereof he affixes his signature.

HARRY E. HARRIS.